United States Patent
Ramold et al.

(10) Patent No.: US 6,374,472 B1
(45) Date of Patent: Apr. 23, 2002

(54) METHOD OF AND APPARATUS FOR MACHINING CRANKPINS

(75) Inventors: Klaus Ramold, Wolframs-Eschenbach; Markus Heinloth, Allersberg; Reinhold Gesell, Weihenzell; Erwin Stallwitz, Lichtenau, all of (DE)

(73) Assignee: Widia GmbH, Essen (DE)

( * ) Notice: Subject to any disclaimer, the term of this patent is extended or adjusted under 35 U.S.C. 154(b) by 0 days.

(21) Appl. No.: 08/973,289

(22) PCT Filed: May 23, 1996

(86) PCT No.: PCT/DE96/00947

§ 371 Date: Dec. 2, 1997

§ 102(e) Date: Dec. 2, 1997

(87) PCT Pub. No.: WO96/39269

PCT Pub. Date: Dec. 12, 1996

(30) Foreign Application Priority Data

Jun. 6, 1995 (DE) .......................... 195 20 058
Jun. 6, 1995 (DE) .......................... 195 19 951
Dec. 11, 1995 (DE) .......................... 195 46 196

(51) Int. Cl.$^7$ .............................. B23B 7/00; B23C 1/00
(52) U.S. Cl. ................... 29/27 R; 29/6.01; 29/888.08; 82/106; 409/132; 409/190
(58) Field of Search ..................... 451/62; 409/131, 409/132, 199, 200, 165, 234, 166; 82/106; 402/12; 29/888.08, 6.01, 27 R (56) References Cited

U.S. PATENT DOCUMENTS

| | | | | |
|---|---|---|---|---|
| 4,116,111 A | * | 9/1978 | Schmid | 82/106 |
| 4,208,156 A | * | 6/1980 | Kralowetz et al. | 82/106 |
| 4,257,724 A | * | 3/1981 | Blaimscheim et al. | 409/232 |
| 4,269,551 A | * | 5/1981 | Kralowetz | 82/106 |
| 4,326,323 A | * | 4/1982 | Kralowetz et al. | 409/200 |
| 4,433,948 A | * | 2/1984 | Kodama | 407/42 |
| 4,521,143 A | * | 6/1985 | Schmid | 409/200 |
| 4,564,323 A | * | 1/1986 | Berback | 409/200 |
| 4,624,610 A | * | 11/1986 | Phillips et al. | 409/132 |
| 4,790,698 A | * | 12/1988 | Heffron | 409/199 |

(List continued on next page.)

FOREIGN PATENT DOCUMENTS

| | | | | |
|---|---|---|---|---|
| AT | 286067 | | 3/1970 | |
| DE | 2559468 | * | 5/1977 | 409/200 |
| DE | 2654949 | | 6/1977 | |
| DE | 3026476 | | 2/1982 | |
| DE | 3807165 | | 9/1988 | |
| DE | 4119162 | | 5/1992 | |
| DE | 4135681 | | 5/1993 | |
| DE | 4315251 | | 11/1993 | |
| DE | 4401326 | | 7/1994 | |
| DE | 4446824 | | 6/1995 | |
| EP | 0464825 | | 1/1992 | |
| JP | 67885 | * | 6/1977 | 409/200 |
| JP | 357114346 | * | 7/1982 | 409/132 |
| SU | 642093 | * | 1/1979 | 409/200 |

*Primary Examiner*—William Briggs
(74) *Attorney, Agent, or Firm*—Herbert Dubno; Andrew Wilford (57) ABSTRACT

To improve a metal-cutting process for machining cylindrical contours, especially eccentric cylindrical contours on a workpiece mounted to rotate about a longitudinal axis, especially with eccentric crankshaft bearings using a lathe tool, producing a finished contour that either has end measures of satisfactory surface quality or has oversize for finish machining such as grinding or dressing, so that while maintaining or enhancing surface quality and maintaining or enhancing dimensional accuracy, machining times are reduced and overall economic efficiency is raised, the invention proposes that the tools tipped with cutting inserts, especially throw-away cutting inserts, are engaged successively or even simultaneously and that at least one part of the cutting inserts is guided in relation to the workpiece at an effective cutting angle ($\gamma f$) between $-5°$ and $+5°$ and/or a positive tool back wedge angle ($\gamma p$).

17 Claims, 4 Drawing Sheets

U.S. PATENT DOCUMENTS

| | | | | |
|---|---|---|---|---|
| 5,037,248 A | * | 8/1991 | Heffron | 407/12 |
| 5,159,741 A | * | 11/1992 | Garschalen et al. | 29/27 R |
| 5,349,888 A | * | 9/1994 | Schmid | 82/106 |
| 5,465,474 A | * | 11/1995 | Kimura et al. | 409/200 |
| 5,529,446 A | * | 6/1996 | Boyer | 409/132 |
| 5,551,814 A | * | 9/1996 | Hazama | 409/200 |
| 5,707,187 A | * | 1/1998 | Arnold | 409/200 |
| 5,725,339 A | * | 3/1998 | Yoshita | 409/132 |
| 5,765,270 A | * | 6/1998 | Schrod et al. | 29/27 R |
| 5,829,930 A | * | 11/1998 | Shimomura | 409/199 |
| 6,068,430 A | * | 5/2000 | Saeki et al. | 82/106 X |

\* cited by examiner

Detail Z

FIG.10

METHOD OF AND APPARATUS FOR MACHINING CRANKPINS

CROSS REFERENCE TO RELATED APPLICATIONS

This application is the US national phase of PCT application PCT/DE96/00947 files May 23, 1996 with a claim to the priorities of German applications 195 19 951.0, 195 20 058.6, and 195 46 196.7 respectively filed June 6, June 6, and Dec. 11, 1995.

FIELD OF THE INVENTION

The invention relates to a method for the metal-cutting machining of cylindrical shapes, in particular of eccentrically mounted cylindrical shapes on a workpiece rotatable about its longitudinal axis, in particular of crank pins by means of a rotatably drivable tool wherein a finished shape is produced such that it either because of sufficiently good surface finish has the final dimensions or that it is oversize for carrying out a finish machining such as grinding or polishing, as well as to an apparatus for carrying out the method and the cutting insert formed therefor.

BACKGROUND OF THE INVENTION

According to the known method crankshaft pins are machined by lathing or rotary lathing with the crankshaft eccentrically mounted so as to produce a purely rotary movement about the crankpin axis. With this mounting, machining of the cheeks is also possible but this type of machining has shown itself to be trouble-prone, in particular the chucks for eccentric mounting of the crankshaft are expensive. In addition the machining by lathing with a tool is done such that in a single operation a finished shape is produced that only needs in the region of the pin a finish machining by grinding. With this machining a different tool must be used for each different crank.

According to the method of the prior art, tool carriers are used with several cutting-insert types used on the tool carrier. By means of this tool carrier the cheeks and undercuts to both sides of the shape and the entire length of the pin are finished in one cutting operation. Thus a tool carrier is needed for each finished shape. According to a special goal of the method in a first step the cheeks are machined and in a second machining step the pins are machined to produce the pin diameter and the undercuts.

According to a second known method the crankshaft is clamped and machined with an inside miller that is moved in an orbit about the crank pin. Disadvantages of this machining are large movements and large moved masses so that high-speed machining is not possible.

A milling head for producing a bearing shape on a crank shaft in one step is known from German 3,824,348. The suggested milling head of the disk or collar type for machining crankshafts which have as surfaces to be machined by milling a cylindrical surface extending parallel to the milling-head axis and preferably merging via a rotation-symmetrical groove into a surface nearly perpendicular to the axis, with on the outside or inside cutter periphery of the milling head sets of indexable cutting plates secured in holders, is so constructed that several sets of index-able cutting plates are arranged uniformly around the cutter periphery of the milling head, that each set of indexable cutting plates fully covers the central shape of the surface of the work-piece to be machined and that at least one indexable cutting plate is provided inside one set of indexable cutting plates for each surface to be individually machined, and is so fitted with special indexable cutting plates that all the surfaces can be simultaneously machined.

An indexable cutting plate which has a polygonal flat body with at least one main cutting edge, a cutting edge, and a free face, is known from German 4,400,570.

Also known is so-called high-speed milling, that is a metal-cutting machine with a miller (outside miller) that works
a) with a high cutting speed of more than 160 m/min,
b) with a thin chip thickness in the region of 0.15 mm, preferably in the region of 0.05 mm to 0.1 mm, and
c) with a reduced cutting-arc length.

The term cutting-art length refers to the length of the tool carrier engaged with the corresponding cutting insert relative to its overall circumference.

High-speed milling produces such a good surface quality that pretreating or additional treatments before heat treatment as a separate step can be completely eliminated. In addition this type of milling, although ideal because of its shortened machining time and better surface quality, is not used to date with the machining of cylindrical shapes, in particular crankshafts because with the known tools
a) as a result of the considerable chip thickness and the relatively small engaging cutters at any time because of the very varied force distribution, considerable vibration is produced,
b) the use of indexable cutting plates with negative cutting angle leads to high machining temperatures, and
c) the high machining speed produces such rapid tool wear that tight tolerances along the pin cannot be guaranteed, so that as a result the indexable cutting plates must be changed often which effectively negates the advantages of high-speed milling.

OBJECT OF THE INVENTION

Starting with the state of the art it is an object of the invention to improve the metal-cutting machining of cylindrical shapes, in particular crankshaft pins, so that while keeping or improving the surface quality and while keeping or improving the dimensional accuracy one achieves a reduction in the machining time so that at the same time the overall efficiency is increased.

SUMMARY OF THE INVENTION

This object is achieved according to the invention by a method of metal-cutting machining of a cylindrical shape in a workpiece that comprises the steps of:
continuously rotating a workpiece about a workpiece axis;
continuously rotating about a tool axis offset from the workpiece axis a tool having a periphery provided with a plurality of cutting inserts; and
bringing the inserts into radial engagement with the workpiece while orienting at least one part of each cutting insert as it contacts the workpiece relative to at an effective cutting angle between −5° and +15° or a positive axial angle.

The inventive method is a machining system which is particularly suitable for the metal-cutting machining of eccentrically mounted cylindrical shapes, in particular crankshaft pins, with a centrally mounted workpiece. Thus both the difficult-to-finish pins as well as the main journals can be finished on the same apparatus or with serial or parallel arrangement of several apparatuses on the same apparatuses.

The production of the finished shape that has the desired finished dimension or is slightly oversize so that it can be reduced by grinding or polishing by means of tools that are equipped with adjacent cutting inserts or that are simultaneously engaged with the workpiece is called cut distribution. This covers for example the separation of the machining of the cheeks of a crankshaft and the machining of the undercuts and the pins of a crankshaft or the production of half a crankshaft-cheek shape with an undercut and a diameter part with a first tool and the production of a second undercut and the remaining diameter part with a second tool. By such a separation or machining with separate tools it is possible to vary the pin length within certain limits, that is even produce pins of different length with a right and a left tool and/or to correct changes in the pin length as a result of tool wear by adjustment with an NC controller.

The machining is carried out in that each tool is driven with constant or variable high speed so that high-speed machining is used. Preferably the variable speed is changed linearly in steps. As a result the advantages of high-speed milling can be achieved even when machining a crankshaft, namely increasing the surface quality, increasing the dimensional accuracy, and reduction of the machining time. For the use of high-speed milling it was necessary to overcome different disadvantages and problems. Thus the use of the already known cutting inserts in existing tools in known apparatus was not possible as they resulted in excessive forces and too much warming for the tools. With flexible crank shafts there is in some cases a great tendency to vibrate. This can be countered in that at least two millers are used. By such division several advantages are obtained. While the use of a single tool creates axial and radial forces which produce forces which can result in considerable vibration, the division can be set such that this is largely avoided. In addition is becomes possible, in particular with NC control of tool advance, that wear of the tool or of the cutting inserts can be compensated for. In addition the workpiece can be of any size so that the finishing of different crankshafts can be done without difficulty on the same production line.

With the procedure according to the invention with two tools that can be considered a "split tool," there are various advantages since different shapes can be produced with the same tools and it is possible to make a correction to compensate for wear of the cutting inserts, in particular of indexable cutting plates.

According to the invention the tools are high-speed millers provided with the necessary cutting inserts. According to a special embodiment, the cutting inserts are so constructed and mounted that in a single workpiece advance half of the finished shape of the pin is produced. Preferably a disk miller is used.

According to a particular embodiment of the invention, indexable cutting plates are provided on one tool for machining the cheek plates and on another tool for finishing the crank pins and for creating the undercuts. All the cutting inserts have a positive cutting angle. The cutting-insert setting relative to the tool is set so as to form an effective cutting angle between −5° and +15°, preferably between −5° and +5° and/or a positive axial cutting angle (back cutting angle $\gamma_p$) up to 10°.

According to a further particularly advantageous embodiment of the invention the cutting inserts are mounted on two tool holders such that a first tool cuts the right-hand side of the shape including the adjacent half of the pin and a second tool cuts the left side of the shape including the adjacent other half of the pin.

To correct an overcut a cutting insert specially made according to the invention is used that is described below structurally. An overcut is the overlap region in a workpiece surface being machined which is created on machining by means of two rows of cutting plates or two tools. As a result of preparation precision or, with a split tool, by precise positioning of the machine there is a height offset between two cutting plates or cutting-plate rows. This produces in the overlap region an undesired sharp-edged offset. In order to avoid this the cutting faces of the preferably used cutting inserts in the region of the main cutting edge form at a cutting corner a flat or recess that extends in the region of the two adjacent main cutting corners. The use of such cutting inserts makes it possible to produce extremely gentle transitions in the overlap region that result in an optically and measurably optimum surface, in particular in the pin region of a crank shaft.

The subdivision of the cut, that is the division of the workpiece finishing into two finishing operations, ensures that during the milling operation fewer blades are simultaneously in contact so that the force of the tool and the likelihood of vibrations is reduced.

As a result of the use of a cutting insert with a positive cutting angle the cutting temperature is lowered along with the forces effective on the tool and the likelihood of vibration.

A further advantage of the method according to the invention is that in the case of separation of the cutting inserts, in particular of indexable cutting plates for making right and left halves of the shape, the wear at the cutting inserts can be compensated for by moving the tool axially or radially.

If the complete shape is produced by a single tool, at least one indexable cutting plate has to be set back, that is manually offset, in order to make equal the wear on both sides.

A further feature of the invention is that at least one tool carrier is an orthogonal miller.

The apparatus for carrying out the machining operation according to the invention should have one support per crankshaft bearing which is outfitted for milling operations for movement along at least one feed axis and for orthogonal rotary milling along two feed axes so that the workpiece can be moved in dependence of the rotation angle of the workpiece such that after the metal-cutting machining of the eccentrically arranged crank-shaft pins a cylindrical correction is produced and the above-described correction procedures are carried out for compensating out wear of the indexable cutting plates.

The special procedure is that the tool is moved along one axis in dependence on the angular position of the workpiece such that after the metal-cutting machine a cylindrical shape is produced. As a result of the high cutting speed and the small chip thickness only modest forces are brought to bear on the workpiece which facilitate machining a flexible workpiece. Simultaneously as a result of the modest rate of advance and the high cutting speed it is possible to produce a better surface quality than has been achievable with similar systems.

Since the entire periphery of the tool is large relative to the actual cut-arc length each individual cutting insert is used only briefly as the tool rotates so that it has ample time to cool. In addition it is possible to use a large number of cutting inserts so that each tool can be counted on to have a long service life.

It is particularly advantageous when according to the invention the high-speed milling is combined with orthogonal rotary milling since the advantages of both types of machine can be optimally combined with each other. Preferably the apparatus for carrying out the method has to this end several supports so that the tool is mounted for orthogonal rotary milling on two slides in order that the tool can follow the workpiece.

The subdivision of the tool and the use of at least two milling steps ensures that preferably the shape is produced by two tools which are mounted on two driven tool carriers in the apparatus. The advantages of a split tool concept relative to the earlier setting of the shape as a complete shape by a single tool in one cutting operation are that 1. The reduction in tool width caused by wear can easily be compensated for by moving the tool.
2. As a result of the lightly angled indexable cutting plate (cutting insert) the finished shape has minimal offset errors.
3. The cut width of the crank pin to be made is easily changed, that is according to setup the produced pin length can be changed with the same tool by about 5 mm.
4. Loading of the machine and workpiece is maintained constant by the small unitary cutting width.

An apparatus according to the invention is thus constructed such that the cutting operation for producing the finished shape is done in at least two cutting operations (cut division) so that the tool holders equipped with indexable cutting plates are engaged one after the other and the tool carrier is only equipped with indexable cutting plates that have a positive cutting angle so that the apparatus has at least two tools provided with cutting inserts with each tool being a high-speed miller provided with the necessary cutting inserts. Preferably a disk miller is used as tool which is provided with the corresponding indexable cutting plates that allow high-speed milling. The pins are machined optimally with an orthogonal rotary miller.

For carrying out such a method or for using the apparatus according to the invention it has been shown to be advantageous when a cutting insert is used having a generally perpendicular cutting face that is peripherally bounded by respective main cutting edges, free faces set at a positive angle and each of whose common edges form auxiliary cutting edges, and a positive cutting angle. The cutting face of the insert has in the region of an adjacent main cutting edge forming a cutting corner a flat or recess which extends into the region of both adjacent main cutting edges. The cutting insert has as is known a flat polygonal body and is preferably constructed such that when used on the workpiece a positive cutting angle is produced. The positive cutting angle lowers the machining temperature and in addition the forces exerted on the tool and thus the likelihood of vibration is minimized. In addition the shape is such that the sum of the free angle and the wedge angle is between 85° and 95°, giving an effective cutting angle $\gamma_f$ between −5° and +5°. If necessary the cutting angle can be as much as 15°. The back cutting angle $\gamma_p$ is set positive and should be at most 10°. With a tangential mounting position of the cutting body the free face is used as effective cutting face as defined above while oppositely the cutting face is used as effective free face. Similarly the effective free face has the above-described flats or recesses. According to function per cutting insert two or even four flats or recesses are possible.

It has been shown that the width of the cutting body or the width of the main cutting edge being used is preferably some-what larger than half of the length of the pin being machined so that as a result of the use of two succeeding inserts of two cutting bodies it is possible to produce an optimal pin surface.

In particular to optically and measurably optimize the overlap region when using two cutting-insert sets so that a nearly perfectly uniform pin surface is produced, a special cutting insert is suggested wherein for at least one tool a support is provided which allows movement of the tool in two mutually perpendicular directions. This special formation is optimally customized for the application. It is particularly advantageous when the cutting face in the region of the cutting-corner corners has a flat or recess, that is during the manufacture of such a cutting insert a flat is formed in the region of the cutting-body corners which ensures that the cutting corner is set back from the main cutting edge. This leads to a softer transition in the overlap region of the insert region of two such inert bodies so that in trials, in particular of the pin surface of a crankshaft, both a measurably and optically optimal surface is produced.

In order to further increase the service life of such a cutting insert which is in particular loaded heavily in the region of the cutting-body corners, flats or recesses are formed in the region of the cutting corners. Such a cutting plate is particularly stable when used in a so-called split tool for separate cuts. The diameter-producing cutting plate of the first tool thus cuts with its dangerous cutting angle 90o into the solid material of the workpiece. As a result of forming support surfaces on the free faces of the cutting corners an additional stabilization is provided in these regions without dropping the positive chip-shaping geometry and/or the four cutters of the cutting plate.

BRIEF DESCRIPTION OF THE DRAWING

The drawing shows the invention with reference to embodiments. Therein.

SPECIFIC DESCRIPTION

Figure 1:
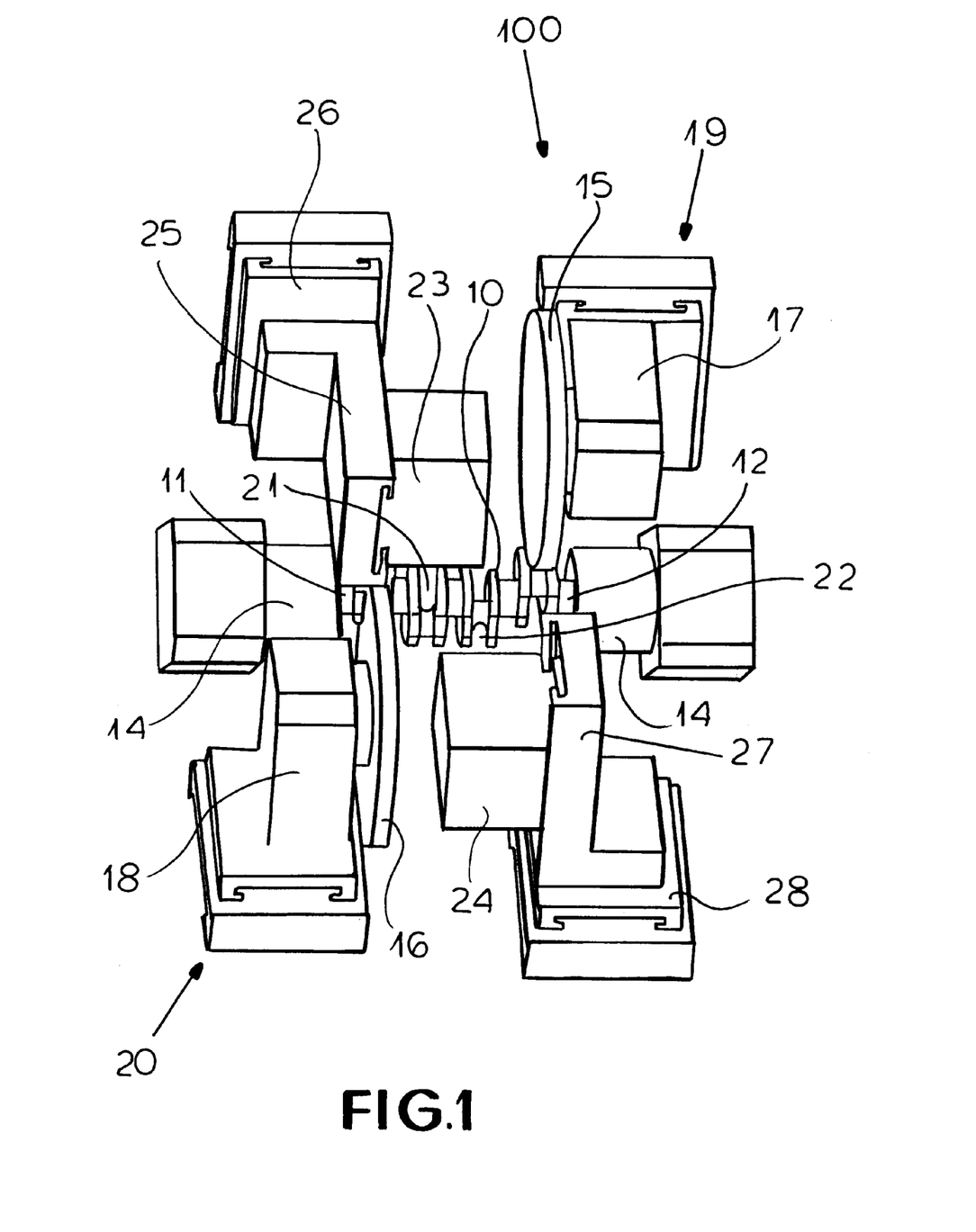
FIG. 1 is a perspective view of an apparatus according to the invention.

FIG. 1 shows in purely schematic form an apparatus 100 for metal-cutting machining relative to the most important parts of the current invention which are all mounted in a machine frame not shown in the drawing. The workpiece 10, here a crank shaft, is held with its ends 11 and 12 in drivable rotatable chucks 14 so that it is rotatable about its central axis. Disk-shaped high-speed tools 15 and 16 powered by corresponding drives 17 and 18 serve for machining, each drive 17 and 18 being mounted in a support 19 and 20 and each tool 15 and 16 being moved along an axis relative to the workpiece 10.

Furthermore the apparatus 100 carries two orthogonal rotary millers 21 and 22 which are also rotated by respective drives 23 and 24. Each orthogonal miller 21 and 22 is carried on a support with two slides 25, 26; 27, 28 so that advance of each orthogonal miller 21 and 22 can also take place when the crankshaft rotates. The illustrated apparatus can simultaneously machine four cranks.

Figure 2:
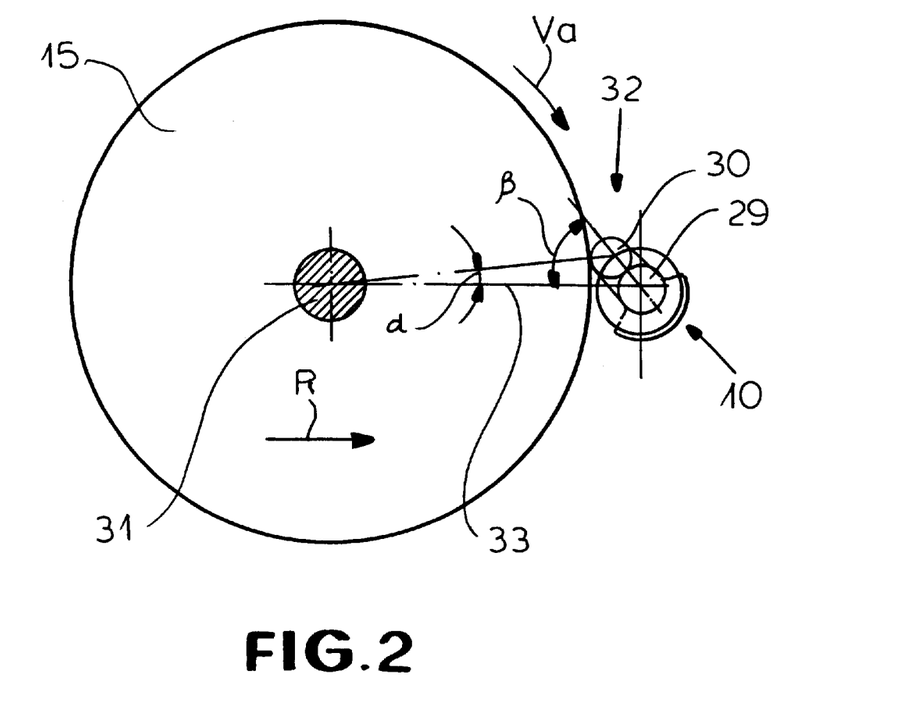
FIG. 2 is a cross section showing the operation according to the method.

The functioning of the high-speed tool that takes place in the apparatus 100 is shown schematically in FIG. 2. In order to in fact carry out a metal-cutting machining of a crank pin 30 outside a center of rotation 29 of the workpiece 10, the disk-shaped tool 15 is rotated about its center axis 31 with constant or variable high speed so that an unillustrated indexable cutting plate mounted on its periphery can be moved past a machining location 32 with a high working speed Vc. The machining location 32 moves with rotation of the tool 10 about the center of rotation 29 and out of a horizontal plane 33 by an angle β. To advance the tool 15 it is moved in direction R along a horizontal axis 33 so that the machining location 32 deflected by the angle α relative to the center axis 31 of the tool 14 is always reached. The tool 15 is thus advanced along an axis of tool-advance movement lying in the horizontal plane 33 dependent on the rotation angle β of the workpiece 10 such that after the metal-cutting machining at the machining location 32 a cylindrical shape is produced. As a result of the high cutting speed Vc and the small chip thickness according to the invention, substantially smaller forces are exerted on the workpiece 10 which lead to advantages.

Figure 3:
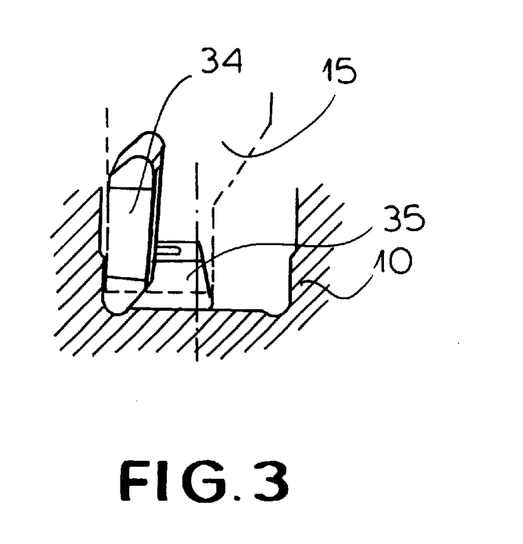
FIG. 3 illustrates the operation of two cutting inserts in a schematic view.

FIG. 3 shows in a purely schematic and partially sectional view how different insert bodies 34 and 35 can be mounted on the tool 15 so as to produce at the machining location 32 of the workpiece 10 a cylindrical shape, in particular for machining the pins of a crankshaft. Thus the insert body 34 produces an undercut while the insert body 35 produces the outside diameter of the pin. The final shape is thus produced by two tools that are identically equipped and are mounted on two driven tool holders in the apparatus.

Figure 4:
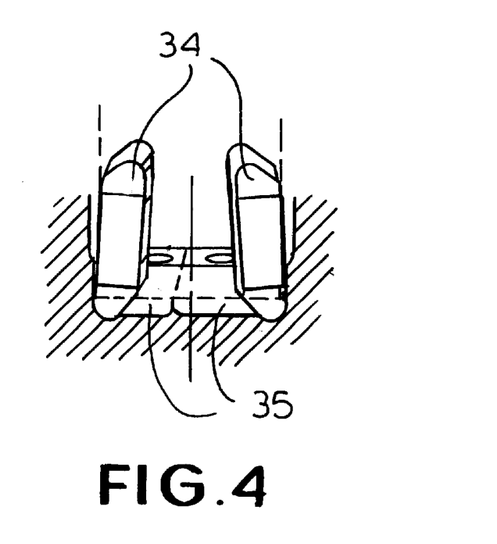
FIG. 4 illustrates the operation of two cutting inserts.
Figure 5:
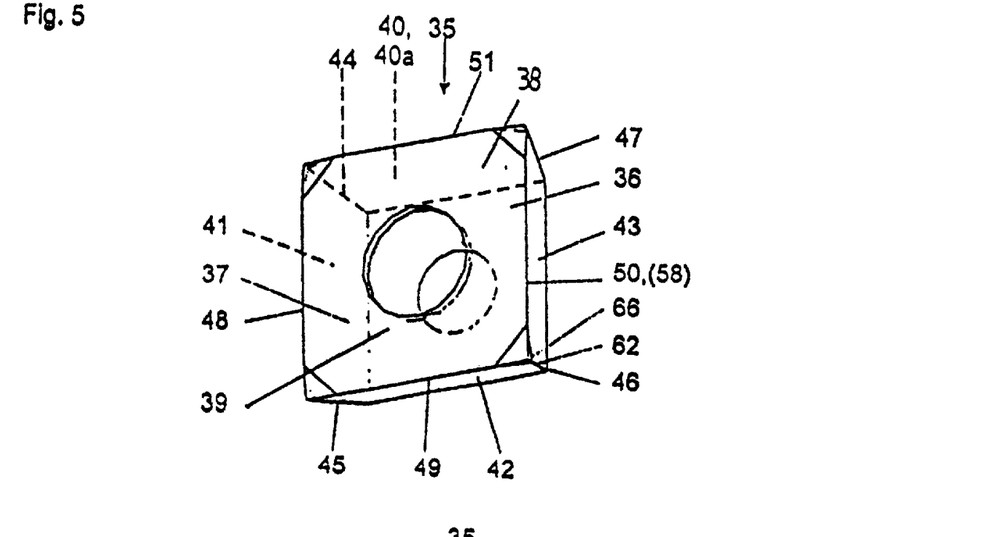
FIGS. 5 and 6 are diagrammatic perspective views of a cutting insert according to the invention.
Figure 6:
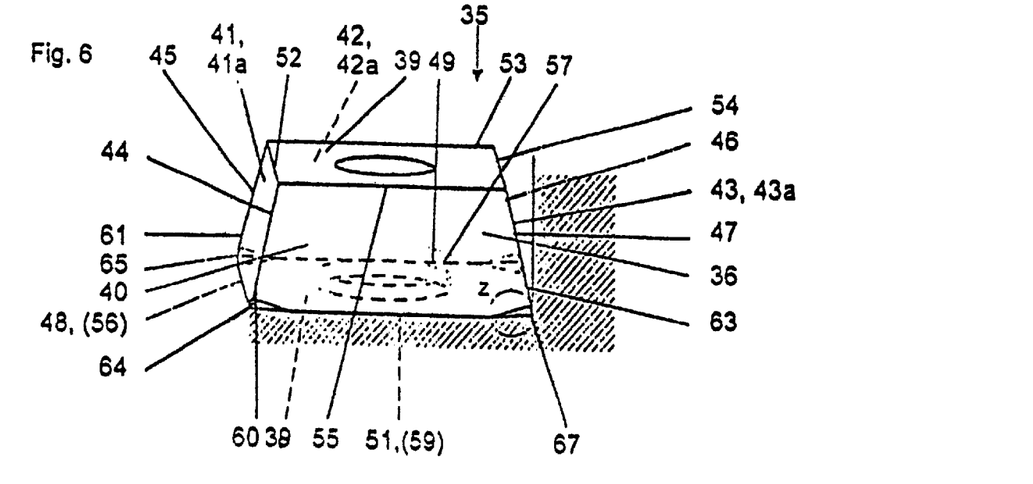
Figure 7:
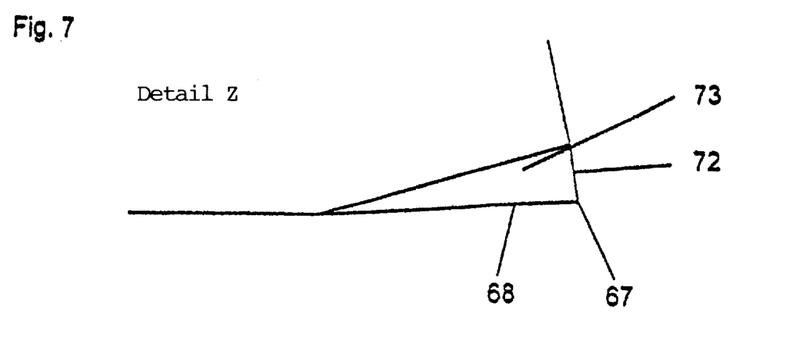
FIG. 7 is a diagram showing use of the cutting insert of FIG. 6.
Figure 8:
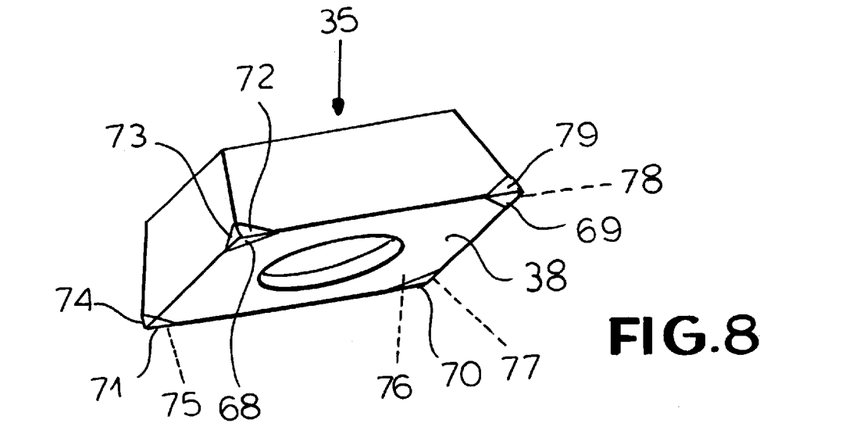
FIGS. 8 through 10 are different views of the cutting insert according to the invention.
Figure 9:
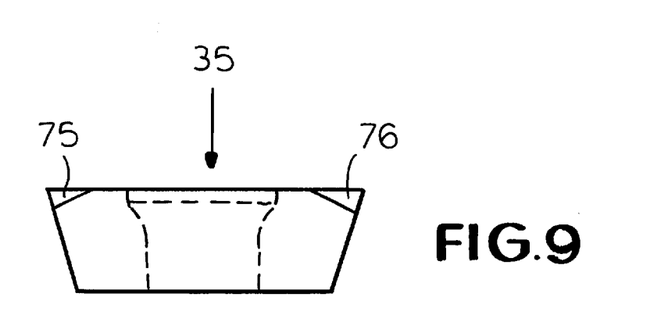
Figure 10:
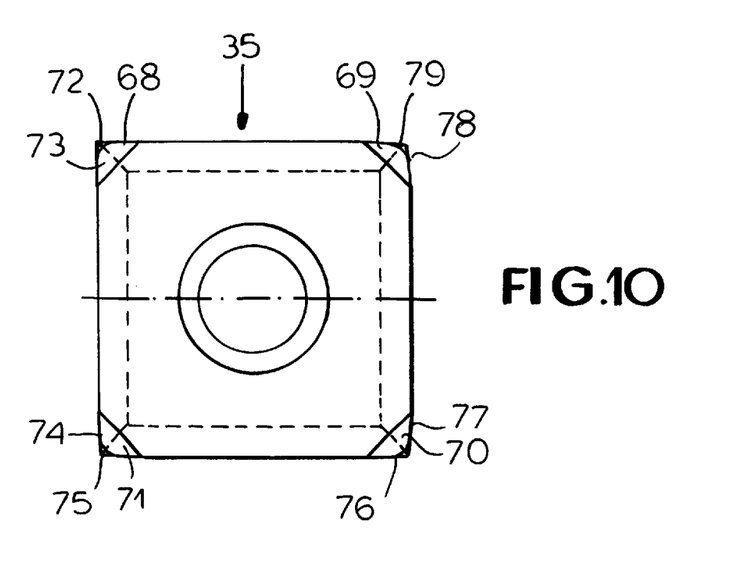

The final shape (two undercuts and the pin machining) can be produced by a single tool in one machining operation whereby for the final shape if necessary a setting back, an axial displacement, and a new advance are carried out at the corresponding locations (FIG. 4). Advantageously to this end a divided tool insert is provided with which correction is easily possible by simple resetting.

When the pin length is machined with two tools, shape flaws in the overcut, which are possibly produced by out-of-round rotation of the workpiece or a kinematic problem, are held as small as possible. To this end according to the invention a completely specially shaped insert body 35 constituted as an indexable cutting plate is proposed which is more closely described below.

In the insert body 35 serving as indexable cutting plate shown in FIGS. 5 through 10 the body 37 of the indexable cutting plate 36 has two opposite end faces 38 and 29 as well as four mutually perpendicular side faces 40, 41, 42, and 43. The side faces 40, 41, 42, and 43 meet at connection corners 44, 45, 46, and 47 and at edges 48 through 55 with the end faces 38 and 39.

The body 37 of the indexable cutting plate 36 thus has a frustopyramidal basic shape and the lower peripheral edges 48, 49, 50, and 51 are formed as cutting edges 56, 57, 58, and 59. The connecting or corner edges 44, 45, 46, and 47 thus form during use of the indexable cutting plate 36 respective auxiliary cutting edges 60, 61, 62, and 63, with each auxiliary cutting edge 60, 61, 62, and 63 is connected via a cutting-body edge 64, 65, 66, and 67 with the corresponding main cutting edge 56, 57, 58, and 59. According to the use position thus each side face 40, 41, 42, and 43 forms a cutting face 40a, 41a, 42a, and 43a.

According to the invention the lower end face 38 of the indexable cutting plate 36 turned toward a workpiece forms flats or recesses 68, 69, 70, and 71 that produce the desired soft transition. In addition further flats 72 through 79 are formed which serves as support surfaces for stabilizing the cutting corners 64, 65, 66, and 67 at the side faces 40, 41, 42, and 43.

Preferably the described cutting inserts are covered with cubic boron nitride or polycrystalline cubical boron nitride or a layer of polycrystalline diamond. In necessary an outer layer of aluminum oxide can be applied. Such coatings are described in detail in German 4,126,851 and 4,126,852 to which specific reference is made.

Alternatively it is also possible to use inlays of cubic boron nitride or polycrystalline diamond which are brazed to the substrate body. Such inlays are described for example in VDI-Z, vol 129 (1987) No. 2, February, pages 64 through 69.

What is claimed is:

1. A method of metal-cutting machining of a cylindrical shape in a crankpin of a crankshaft, the method comprising the steps of:

continuously rotating the crankshaft about a crankshaft axis offset from an axis of the crankpin;

continuously rotating about a tool axis generally parallel and offset from the crankshaft and crankpin axes a tool having an outer periphery provided with a plurality of cutting inserts; and displacing the inserts radially of the crankshaft axis into engagement with the crankpin while orienting at least one part of each cutting insert as it contacts the crankpin relative to an effective cutting angle between −5° and +15° or a positive axial angle.

2. The method defined in claim 1 wherein the tool axis is reciprocated radially of the crankshaft axis synchronously with rotation of the crankshaft such that after the metal-cutting machining a cylindrical shape is produced on the crankpin.

3. The method defined in claim 1 wherein the cutting operation for producing the finished shape is done in two cutting operations.

4. A method of metal-cutting machining of a cylindrical shape in a crankpin of a crankshaft, the method comprising the steps of:

continuously rotating the crankshaft about a crankshaft axis offset from an axis of the crankpin;

continuously rotating at a cutting speed of more than 160 m/min about a tool axis generally parellel and offset from the crankshaft and crankpin axes a tool having an outer periphery provided with a plurality of cutting inserts; and displacing the inserts radially of the crankshaft axis into engagement with the crankpin while orienting at least one part of each cutting insert as it contacts the crankpin relative to an effective cutting angle between −5° and +15° or a positive axial angle to produce a chip thickness of about 0.1 mm to 0.3 mm.

5. The method defined in claim 4 wherein a cutting-arc length of the tool in engagement with each of the corresponding cutting inserts amounts relative to an outer periphery of the tool only to a tenth to a thousandth of a circumference of the outer periphery of the tool.

6. A method of metal-cutting machining of a cylindrical shape in a crankpin of a crankshaft, the method comprising the steps in a first step of:

continuously rotating the crankshaft about a crankshaft axis offset from an axis of the crankpin;

continuously rotating about a tool axis generally parellel and offset from the crankshaft and crankpin axes a first tool having an outer periphery provided with a plurality of cutting inserts all of a predetermined type;

displacing the inserts of the first tool radially of the crankshaft axis into engagement with the crankpin while orienting at least one part of each cutting insert as it contacts the crank pin relative to an effective cutting angle between −5° and +15° or a positive axial angle; and in a second step continuously rotating the crankshaft about a crankshaft axis offset from an axis of the crankpin;

continuously rotating about a tool axis offset from the crankshaft and crankpin axes a second tool having an outer periphery provided with a plurality of cutting inserts all of a predetermined type different from that of the first tool; and displacing the inserts of the second tool radially of the crankshaft axis into engagement with the crankpin while orienting at least one part of each cutting insert as it contacts the crank pin relative to an effective cutting angle between −5° and +15° or a positive axial angle.

7. The method defined in claim 6 wherein in the first step at least one crank cheek is machined and in the second step at least one crank pin is machined to produce a pin diameter and undercuts.

8. The method defined in claim 6 wherein the finished shape has right-side surfaces and left-side surfaces offset along the crankshaft axis therefrom and in the first step the right-side surfaces and in the second step the left-side shapes of the finished shape are formed.

9. The method defined in claim 6 wherein one of the steps is carried out as an orthogonal rotary milling.

10. A method of metal-cutting machining of a cylindrical shape in a crankpin of a crankshaft, the method comprising the steps of:

continuously rotating the crankshaft about a crankshaft axis offset from an axis of the crankpin;

continuously rotating about a tool axis generally parallel and offset from the crankshaft and crankpin axes a tool having an outer periphery provided with a plurality of cutting inserts;

displacing the inserts radially of the crankshaft axis into engagement with the crankpin while orienting at least one part of each cutting insert as it contacts the crankpin relative to an effective cutting angle between −5° and +15° or a positive axial angle; and a support carrying the tool and provided with two slides allowing movement of the tool in two directions perpendicular to the crankshaft axis.

11. An apparatus for metal-cutting machining of a cylindrical shape in a crankpin of a crankshaft, the apparatus comprising:

means for continuously rotating the crankshaft about a crankshaft axis offset from an axis of the crankpin;

means for continuously rotating about a tool axis generally parallel and offset from the crankshaft and crankpin axes a tool having an outer periphery provided with a plurality of cutting inserts; and means for displacing the inserts radially of the crankshaft axis into engagement with the crankpin while orienting at least one part of each cutting insert as it contacts the crankpin at an effective cutting angle between −5° and +15° or a positive axial angle.

12. An apparatus for metal-cutting machining of a cylindrical shape in a crankpin of a crankshaft, the apparatus comprising:

means for continuously rotating the crankshaft about a crankshaft axis offset from an axis of the crankpin;

means for continuously rotating about a tool axis generally parallel and offset from the crankshaft and crankpin axes a tool having an outer periphery provided with a plurality of cutting inserts; and means for displacing the inserts at a high cutting speed of more than 160 m/min radially of the crankshaft axis into engagement with the crankpin while orienting at least one part of each cutting insert as it contacts the crankpin at an effective cutting angle between −5° and +15° or a positive axial angle to produce a small chip thickness of about 0.1 mm to 0.3 mm.

13. An apparatus for metal-cutting machining of a cylindrical shape in a crankpin of a crankshaft, the apparatus comprising:

means for continuously rotating the crankshaft about a crankshaft axis offset from an axis of the crankpin;

first and second tools rotatable about a tool axis generally parallel and offset from the crankshaft and having outer peripheries provided with respective pluralities of cutting inserts, the inserts of the first tool being of a type different from the inserts of the second tool;

means for continuously rotating the tools about the tool axis; and means for displacing the inserts of the first radially of the crankshaft axis into engagement with the crankpin while orienting at least one part of each of the respective cutting inserts as they contact the crankpin at an effective cutting angle between −5° and +15° or a positive axial angle in a first step and for displacing the inserts of the second tool radially of the crankshaft axis into engagement with the crankpin while orienting at least one part of the respective cutting inserts as they contact the crankpin at an effective cutting angle between −5° and +15° or a positive axial angle in a second step.

14. The apparatus defined in claim 13 therein the tools are high-speed millers provided with corresponding cutting inserts.

15. The apparatus defined in claim 13 wherein disk millers are used as the tools.

16. The apparatus defined in claim 13 wherein orthogonal rotary millers are used as the tools.

17. The apparatus defined in claim 13 wherein the inserts are mounted tangentially on the respective tools.

* * * * *